G. F. GODLEY.

Assignor by Mesne Assignments of Part Interest to C. Scott & M. F. Prudden.

CAR-SPRINGS.

No. 7,852. Reissued Aug. 21, 1877.

Witnesses:

P. C. Dieterich

James Duffy

Inventor:

Geo F. Godley

Per A. Lloyd Wiggins Attorney.

N. PETERS, PHOTO-LITHOGRAPHER, WASHINGTON, D. C.

UNITED STATES PATENT OFFICE.

GEORGE F. GODLEY, OF PHILADELPHIA, PENNSYLVANIA, ASSIGNOR, BY MESNE ASSIGNMENTS, OF PART INTEREST TO CHARLES SCOTT AND MARY F. PRUDDEN, OF SAME PLACE.

IMPROVEMENT IN CAR-SPRINGS.

Specification forming part of Letters Patent No. 155,578, dated October 6, 1874; Reissue No. 7,852, dated August 21, 1877; application filed March 27, 1877.

*To all whom it may concern:*

Be it known that I, GEORGE F. GODLEY, of the city and county of Philadelphia, and State of Pennsylvania, have invented an Improvement in Car-Springs, of which the following is a specification:

My invention relates to that class of springs known as edge-rolled or edge-coiled—that is to say, made by coiling the bar or blank with its greatest width at right angles to, or nearly at right angles to, the axis of the coil.

My improvements consist in a special construction of coiled steel spring, having for its object increased strength, greater carrying capacity, and economy of metal; and it consists in making the spring with flat surfaces on the thicker parts, which are liable to come in contact with each other when the spring is compressed, and with a web or webs having a lesser thickness, as hereinafter described; and it also consists in a coiled car-spring having a thin part in cross-section, and coiled with such thin part on the interior of the coil.

Figure 1:
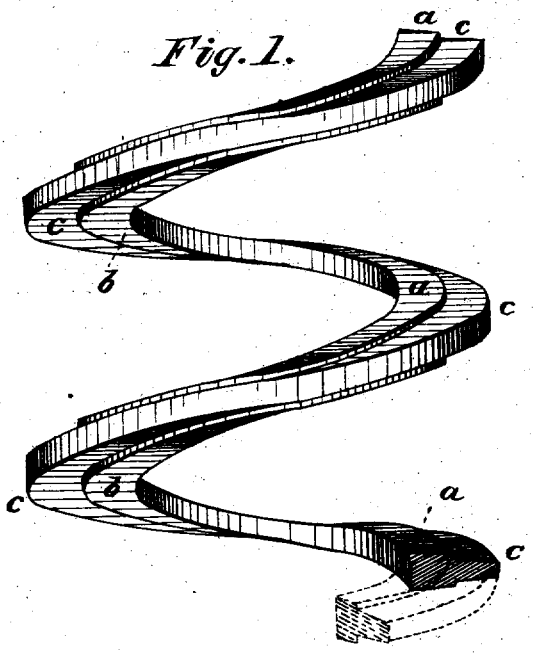
Figure 2:
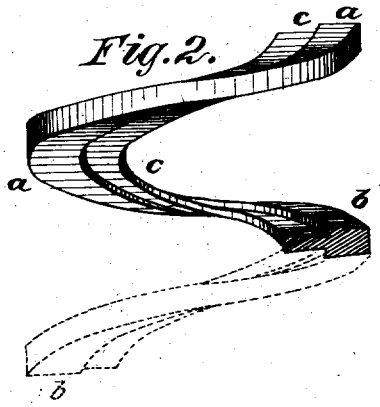

In the drawings accompanying and forming part of this specification, Figure 1 illustrates a spring made in accordance with my invention, the thin or depressed part beyond the flat surfaces being outside. Fig. 2 illustrates a spring made of a bar coiled with the thicker portion on the exterior.

The bar of which the spring is made has, as will be seen, two opposite flat parallel surfaces, *a b*, and extending beyond such flat surfaces a web, *c*, made considerable thinner than the other portion, the cross-section of the bar being of a T form.

When this bar is coiled into a spiral, as shown in Fig. 1, it will be seen that the flat surfaces *a b*, when the spring is compressed to its fullest extent, bear upon each other, and avoid lateral strain or pressure of one coil upon another, such lateral pressure being very injurious, and incident to springs formed from cylindrical bars; and the value of these flat surfaces is important and evident, whether the spring be coiled into a cylindrical shape or into a cone shape, for in the latter not only is the undue lateral pressure prevented, but there is no possibility of the coils telescoping or becoming flattened down, coil within coil.

The web *c*, when the spring is tempered, by reason of its thinness, becomes tempered throughout, thus affording the requisite elasticity or resilience; and the thicker portion *a b*, during the same tempering process, becomes surface-tempered, leaving its internal part untempered and tough, thus giving the qualities most desirable in a good spring.

For a bolster or journal, or for equalizing-bars for freight or passenger cars, I propose to coil in a cone shape, for the reason that, the base being then of a larger diameter, the spring gives a a soft and easy motion to a light or unladen car, while at the same time it secures the advantage due to the flat adjacent surfaces of the coils. This is a very great advantage over a cone-coiled wire or round rod, because in them the gradually-increasing diameter of the cone causes each coil, when under pressure, to force the next coil out of place.

In cases requiring a small central hole or opening through the coil, I coil the bar so that the thinner or reduced portion or web *c* shall be on the inside, as shown in Fig. 2, instead of on the exterior, as in Fig. 1. This also enables me to use a much smaller mandrel, and to make a coil of much less diameter, and without any liability of overtaxing or overstraining the thicker portion, either in the act of coiling or when the spring is in actual use.

This mode of coiling—*i. e.*, with the reduced or thinner portion of the bar or blank on the inside of the coil—gives a greater range of motion when the spring is in use, because the thickening of the internal portion of the spring, in and by the act of coiling, does not bring the two adjacent faces of the coil sufficiently near to collide against each other when the spring is compressed; but, on the contrary, the act of coiling renders the thicker or exterior portion of the bar thinner, thus making the space between the coils actually greater.

I find that springs made agreeably to my present invention have a carrying capacity of nearly fifty per cent. more than the ordinary springs made of cylindrical rods, and that there is an economy of about twenty-five per cent. in the amount of steel required, besides greater strength and durabilily. I also find that one of my springs, occupying a given space, gives more strength than the two coils of round rods, one within the other, ordinarily used, and occupying the same space.

Figure 3:
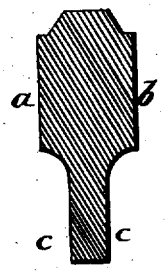
Figure 5:
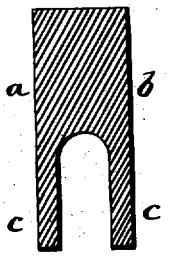
Figure 4:
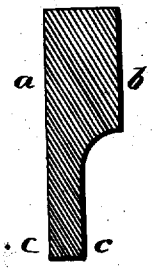

Figs. 3, 4, and 5 show in cross-section modifications of the form of the bar, each, however, having, as will be seen, the features which constitute the essence of my invention—namely, the two opposite flat surfaces, and the projecting thinner portion or web. It will be evident that still other forms may be made without departing from the spirit of the invention, such as an H form, or that the web part may, if desired, have its sides slightly inclined.

What I claim is—

1. A metal car-spring having flat surfaces *a b*, and a web or webs, *c*, having a lesser thickness beyond such surfaces, substantially as shown and described.

2. A spiral metal car-spring, formed of a bar having a part thinner in cross-section than the rest, and coiled with such thin part in the interior of the coil, substantially as and for the purpose set forth.

3. An edge-coiled spiral spring made from a blank form or bar of metal, having two or more independent thicknesses in different parts of the same cross-section, and presenting opposite flat surfaces in each of such thicknesses.

4. An edge-coiled spiral car-spring made from a metallic blank having parallel sides, but with one edge thicker than that of its opposite edge or edges.

5. As an article of manufacture, a blank form or bar of metal adapted for making edge-coiled springs for vehicles, and having one of the forms in its cross-section, as described, and as shown in Figs. 1 to 5, respectively.

GEORGE F. GODLEY.

Witnesses:

ANDREW J. BOSWELL,
ARTHUR BOSWELL.